United States Patent
Bhat et al.

(10) Patent No.: US 9,514,030 B2
(45) Date of Patent: *Dec. 6, 2016

(54) DYNAMIC TRACING FRAMEWORK FOR DEBUGGING IN VIRTUALIZED ENVIRONMENTS

(71) Applicant: International Business Machines Corporation, Armonk, NY (US)

(72) Inventors: Kavana N. Bhat, Bangalore (IN); Shajith Chandran, Bangalore (IN); Prateek Goel, Bangalore (IN); Sivakumar Krishnasamy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/151,640

(22) Filed: May 11, 2016

(65) Prior Publication Data

US 2016/0292063 A1    Oct. 6, 2016

Related U.S. Application Data

(63) Continuation of application No. 15/014,600, filed on Feb. 3, 2016, now Pat. No. 9,372,782, which is a continuation of application No. 14/676,886, filed on Apr. 2, 2015.

(51) Int. Cl.
G06F 9/44    (2006.01)
G06F 11/36   (2006.01)

(52) U.S. Cl.
CPC .................. *G06F 11/364* (2013.01)

(58) Field of Classification Search
CPC ...................... G06F 11/364; G06F 11/3636
See application file for complete search history.

(56) References Cited

U.S. PATENT DOCUMENTS

| 7,673,180 B1 * | 3/2010 | Chen .................. G06F 11/362 |
| | | 714/38.11 |
| 7,818,721 B2 | 10/2010 | Sundararajan et al. |
| 8,635,600 B2 * | 1/2014 | Lakshminarayanachar G06F 9/45504 |
| | | 702/168 |
| 9,223,681 B2 | 12/2015 | Delporte |
| 9,372,782 B1 | 6/2016 | Bhat et al. |
| 2004/0123279 A1 | 6/2004 | Boykin et al. |
| 2005/0229165 A1 | 10/2005 | Ma et al. |
| 2006/0167950 A1 * | 7/2006 | Vertes ............... G06F 11/3476 |

(Continued)

OTHER PUBLICATIONS

Bhat et al.; U.S. Appl. No. 14/676,886, filed Apr. 2, 2015; Entitled "Dynamic Tracing Framework for Debugging in Virtualized Environments".

(Continued)

*Primary Examiner* — Philip Wang
(74) *Attorney, Agent, or Firm* — Walter L. Rudberg

(57) ABSTRACT

Embodiments of the present invention provide a system and method for a dynamic tracing framework for debugging in a virtualized environment. Embodiment of the present invention can include selecting a home node and a set of remote nodes to which apply a set of probes. Data collection is performed by a tracing agent of each node and the collection of data is shared across multiple software systems.

1 Claim, 3 Drawing Sheets

(56) References Cited

U.S. PATENT DOCUMENTS

| | | | |
|---|---|---|---|
| 2007/0180439 A1* | 8/2007 | Sundararajan | G06F 11/3644 |
| | | | 717/158 |
| 2010/0333071 A1 | 12/2010 | Kuiper et al. | |
| 2012/0159454 A1* | 6/2012 | Barham | G06F 9/45558 |
| | | | 717/128 |
| 2012/0192154 A1* | 7/2012 | Alpern | G06F 11/362 |
| | | | 717/124 |
| 2014/0215443 A1 | 7/2014 | Voccio et al. | |
| 2015/0193328 A1 | 7/2015 | Deakin et al. | |

OTHER PUBLICATIONS

List of IBM Patents or Patent Applications Treated as Related; Dated Jun. 29, 2016; 2 pages.

* cited by examiner

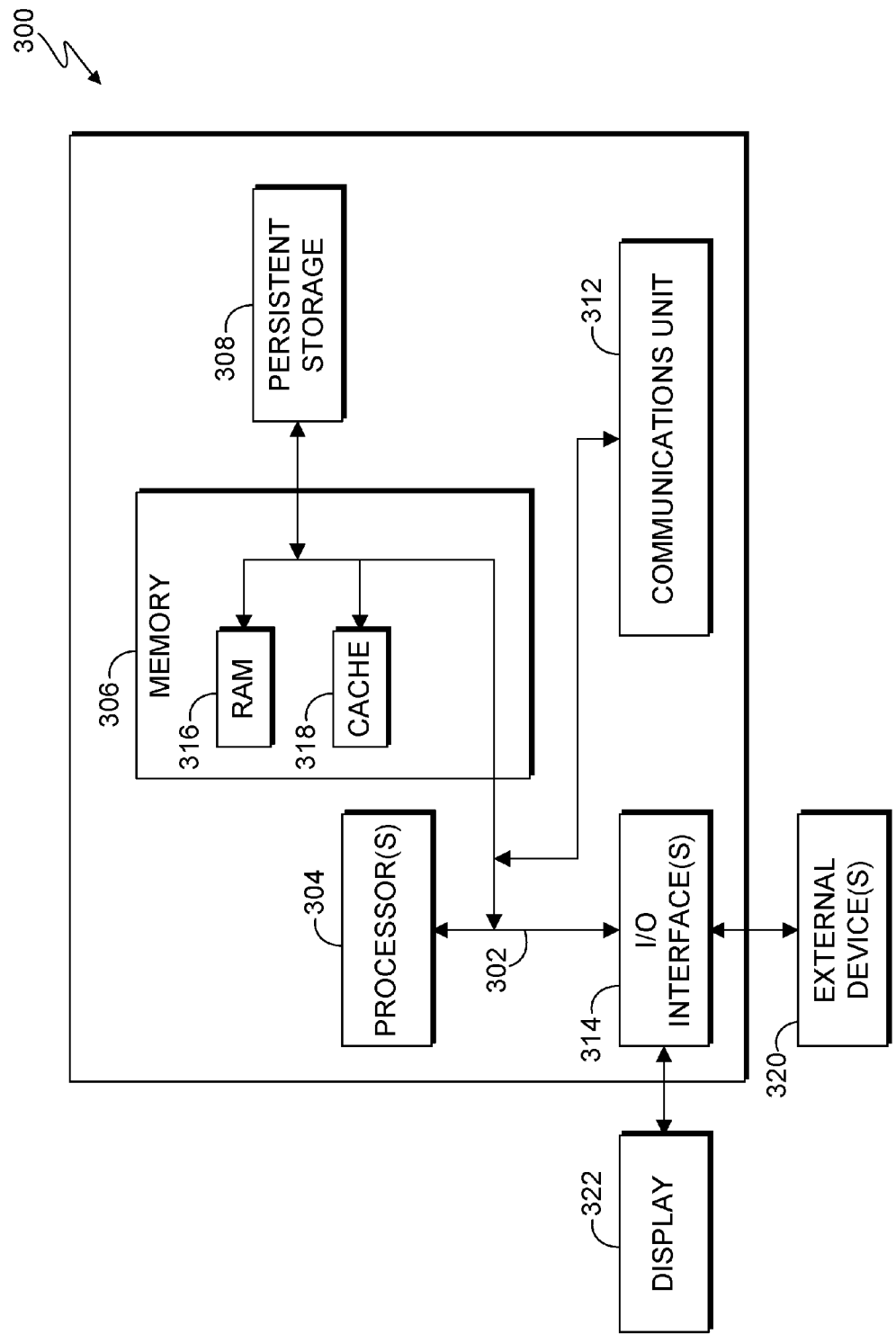

DYNAMIC TRACING FRAMEWORK FOR DEBUGGING IN VIRTUALIZED ENVIRONMENTS

BACKGROUND OF THE INVENTION

The present invention relates generally to the field of debug tracing, and more particularly to a dynamic tracing framework for debugging issues in virtualized environments.

With the advent of virtualization technologies, there are multiple software systems involved in processing data. In a non-virtualized environment, I/O devices are directly connected to a server and the data is directly delivered to the direct attached network or storage device, whereas in a virtualized environment, at least three major software systems are involved. These software systems run across virtual machines (VMs).

It is known that when an issue or failure occurs, debug data is collected across multiple software systems in the virtualized environment, and then the debug data is subsequently post-processed. All of the debug data is collected at the same time across all of the software systems, and the identification and correlation of the sequence of events within the collected debug data may be very complex.

SUMMARY

According to one embodiment of the present invention, a method for a dynamic tracing framework is provided, the method comprising: selecting a home node from a plurality of nodes; identifying, by a tracing agent of the home node, a set of tracing agents associated with the plurality of nodes; applying a set of probes to the set of tracing agents associated with the plurality of nodes; sending, to the tracing agent of the home node and the set of tracing agents associated with the plurality of nodes, an indication to start probing; determining whether the tracing agent of the home node and the set of tracing agents associated with the plurality of nodes have started probing; and responsive to determining that the tracing agent of the home node and the set of tracing agents associated with the plurality of nodes have started probing, continuing tracing and collection of data.

Another embodiment of the present invention provides a computer program product for a dynamic tracing framework, based on the method described above.

Another embodiment of the present invention provides a computer system for a dynamic tracing framework, based on the method described above.

BRIEF DESCRIPTION OF THE DRAWINGS

FIG. 3 is a block diagram of internal and external components of the devices of FIG. 1, in accordance with an embodiment of the present invention.

DETAILED DESCRIPTION

Debugging issues or failures in virtualized environments may often be very complex. Known tools exist to capture debug data independently in each of the software systems and are later post processed in identifying the specific component, which can be tedious and time consuming. Also, the existing debug tools produce large quantities of debug data, which can take hours to days for an expert to analyze. In order to overcome issues associated with the debugging process, a dynamic tracing approach has been introduced in which a user may implant debug points and collect varied data, as required, on the fly, without having to recompile the code. Embodiments of the present invention provide efficient and cost-effective systems and methods for an end-to-end dynamic tracing of a framework for debugging in a virtualized environment, which is capable of implanting code on-the-fly to provide relevant debug information as the data traverses across the virtual machines.

Figure 1:
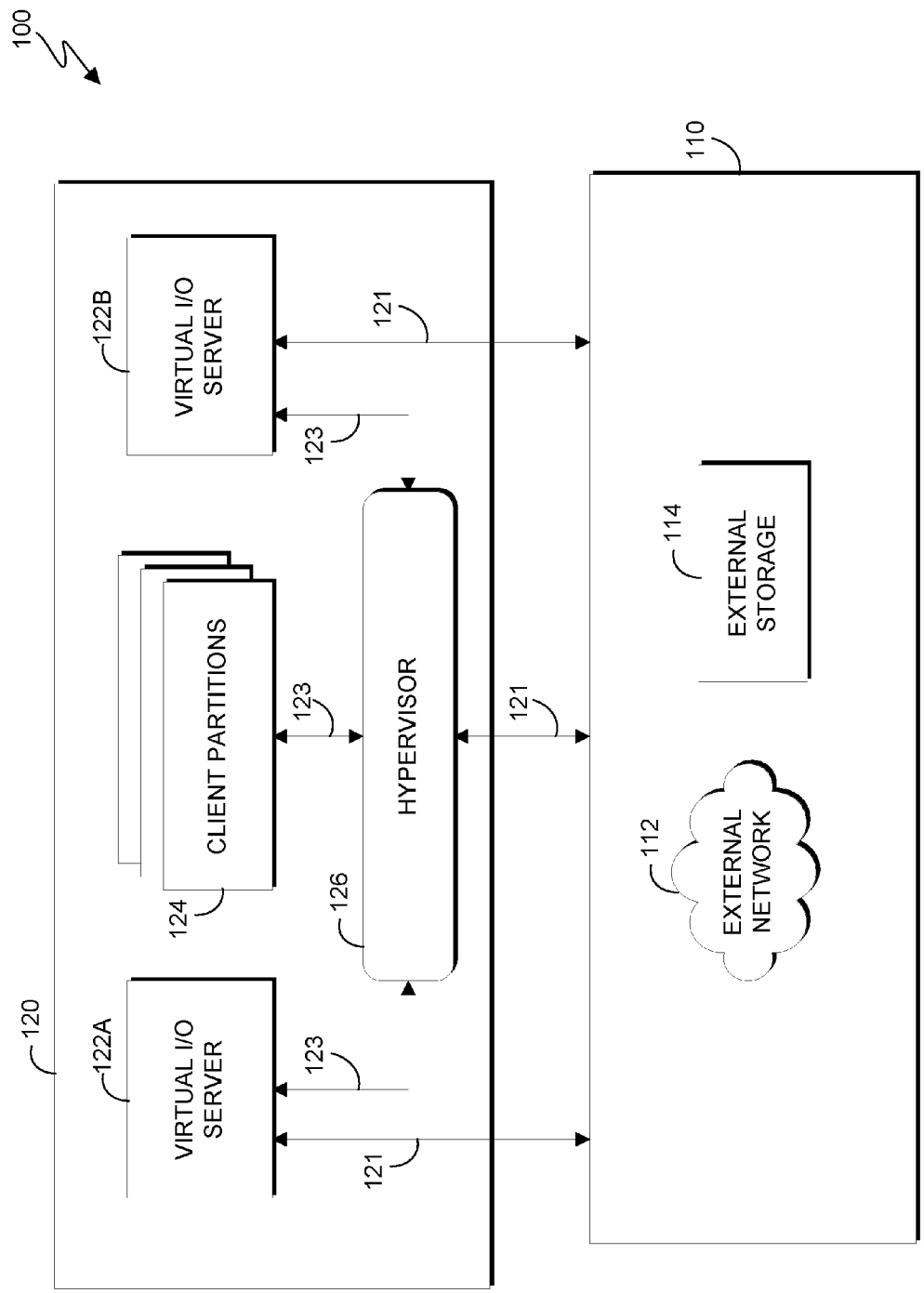
FIG. 1 depicts a functional block diagram illustrating a virtualized production environment, in accordance with an embodiment of the present invention.

The present invention will now be described in detail with reference to the Figures. FIG. 1 depicts a functional block diagram illustrating a virtualized production environment, generally designated 100, in accordance with an embodiment of the present invention. Modifications to virtualized production environment 100 may be made by those skilled in the art without departing from the scope of the invention as recited by the claims. In an exemplary embodiment, virtualized production environment 100 includes external components 110 and virtual components 120, interconnected by physical connectivity 121.

External components 110 includes external network 112 and external storage 114. External network 112 can be, for example, a local area network (LAN), a wide area network (WAN) such as the Internet, or a combination of the two, and can include wired, wireless, or fiber optic connections. In general, external network 112 can be any combination of connections and protocols. External storage 114 is an example of known data storage repositories.

Virtual components 120 includes virtual I/O servers (VIOS) 122A and 122B, client partitions 124, hypervisor 126, and virtual network and storage 123. To enable the distributed dynamic tracing framework, all software systems have a dynamic tracing agent (DTA, not depicted in FIG. 1) which is responsible for handling commands from other DTAs in virtualized production environment 100.

Client partitions 124 represent one or more logical partitions (LPARs). In other embodiments, client partitions 124 may be divided into greater than 100 LPARs, each configured to share its communication across multiple VIOS 122A and 122B. There are also hundreds of configuration settings and/or attributes which are tuned across these software systems for optimal performance.

In this exemplary embodiment, virtual network and storage 123 are virtualized communications. Any network and/or storage data from client partitions 124 traverses through hypervisor 126. Hypervisor 126 forwards the data to one of VIOS 122A and/or 122B, via virtual network and storage 123.

VIOS 122A and 122B own all of the physical resources in a completely virtualized environment. VIOS 122A and 122B receive data from client partitions 124 and forward the data to outside the virtualized environment, via physical connectivity 121.

Figure 2:
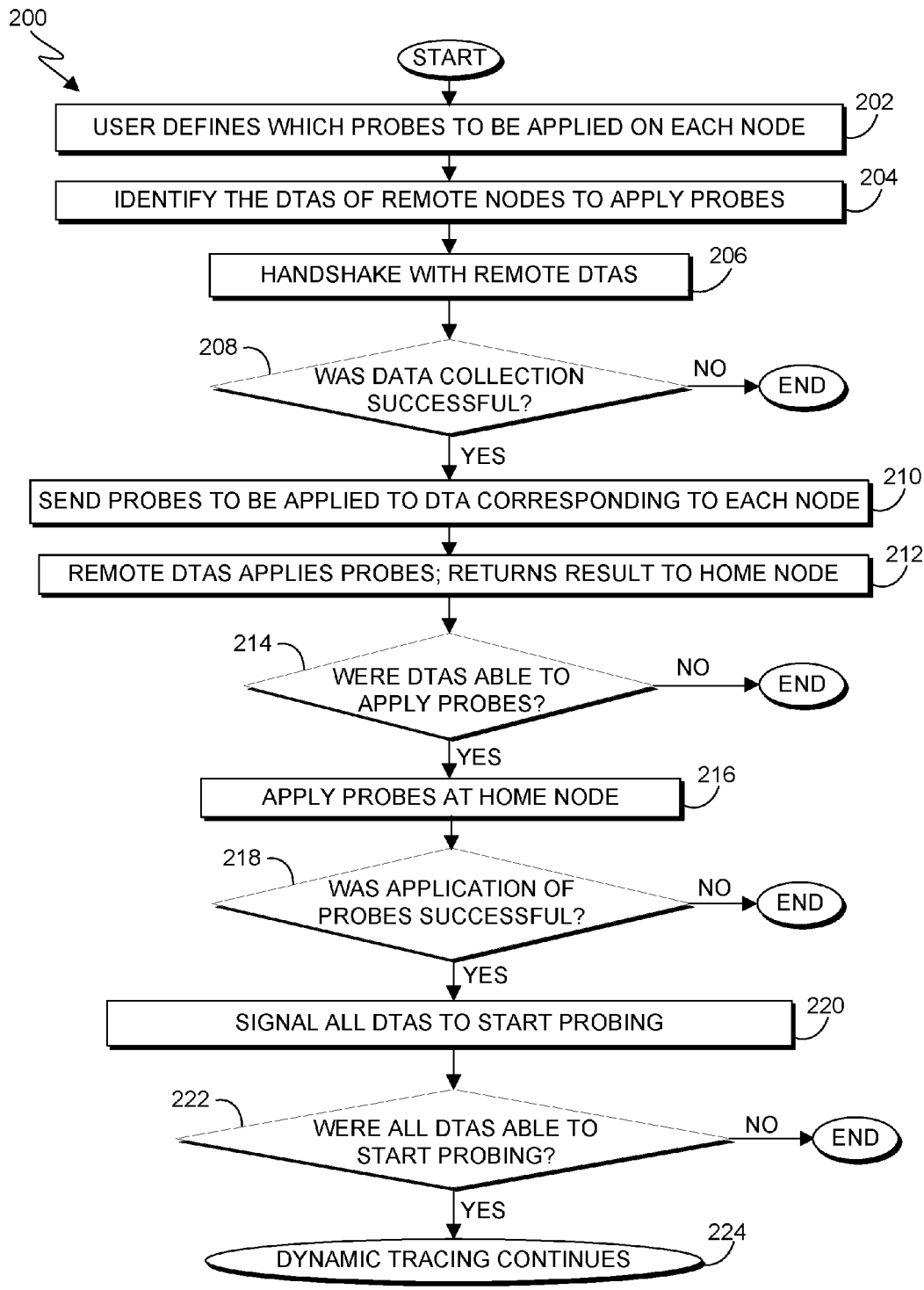
FIG. 2 depicts a flowchart illustrating operational steps for activating and executing a dynamic tracing framework shared across multiple VMs, in accordance with an embodiment of the present invention.

FIG. 2 depicts flowchart 200 illustrating operational steps for activating and executing a dynamic tracing framework shared across multiple VMs, in accordance with an embodiment of the present invention.

In step 202, a user defines which probes to be applied on each node (i.e., system). In this exemplary embodiment, a home node is selected, which is the node from where the dynamic tracing session is activated. Specifying which probes to enable on which nodes may be devised by enhancing the infrastructure in a way that users specify a new construct which lists the probes to be inserted and where the probes are to be inserted. A user may be able to specify all the required information from a single script so that the process flows as a single debugging session.

In step 204, the DTA of the home node identifies the DTAs of remote nodes of which to apply probes. In other embodiments, users may have the option to specify which variables to share across VMs, and a dynamic tracing framework generates the code to acquire, lock, and access the variables. The variables may be marked as "cross_vm_access" keyword, so that the dynamic tracing framework knows these variables are shared across VMs.

In step 206, the DTA of the home node performs a handshake with the DTAs of each identified remote node to which the probes are applied. The handshake is an acknowledgement by each component that a transfer of data will be taking place between the two components. In this exemplary embodiment, all DTAs involved reach a consensus as to what is the maximum amount of data which needs to be shared, so that the memory sharing may be effective. This maximum size is 'per session' and can be known, as the user may specify this information. There is a 'lock' for every variable, which is marked as 'shared', so that the lock contention when accessing the variables may be reduced. In other embodiments, rather than sharing memory, a virtual local area network (VLAN) can be dynamically configured among the required VMs for DTAs to communicate, in order to share the common data variables.

In step 208, the DTA of the home node determines whether the data collection was successful. If the data collection was not successful, then the operational steps of FIG. 2 end. If the data collection was successful, then, in step 210, the DTA of the home node sends probes to be applied to the DTA corresponding to each identified remote node.

In step 212, each remote DTA applies the sent probe and returns a result of success or failure to the home node. In this exemplary embodiment, there are two options as to how the data may be viewed. First, each node may collect the data, and keep the data at the respective node. In this case, it is the responsibility of the home node to pull the data from each DTA and provide a single view to the user. Second, each DTA may continuously push the collected data to the home node, where all of the data is sorted and presented to the user. In other embodiments, a user can see the collected data on each individual VM.

In step 214, the DTA of the home node determines whether all of the DTAs of the other nodes were able to apply the requested probes. For the DTA(s) which return a result of a failure to apply the requested probes, the operational steps of FIG. 2 end. If the DTA(s) of the other nodes were able to apply the requested probes, then, in step 216, the DTA of the home node applies the specified probes at the home node.

In step 218, the DTA of the home node determines whether the application of the probes was successful. If the application of the probes was not successful (i.e., a failure occurred), then the operational steps of FIG. 2 end. If the application of the probes was successful, then, in step 220, a signal is sent to all of the identified DTAs, and the DTA of the home node, to start probing. The underlying communications of DTAs could be performed using socket programming, using RPCs, or using service layer protocol facilities. Communication commands can be defined so that DTAs can communicate with each other. In this exemplary embodiment, collected tracing data is shared among each node (i.e., system).

In step 222, the DTA of the home node determines whether all of the DTAs were able to start the probing. If any of the DTAs return a failure to start probing, then the operational steps of FIG. 2 end. If all of the DTAs are able to start probing (i.e., no failures returned), then, in step 224, the dynamic tracing process continues and data continues to be collected until a stop command is processed.

Accordingly, by performing the operational steps of FIG. 2, the required probes are implanted in the required system(s), and data collection is performed either upon request (from a debugger client) or pushed out by the VMs being debugged when the probes are triggered. The data flow in and out of the VMs through various entities in the virtualized stacks is tracked, and this tracking is synchronized with the help of dynamic tracing session data sharing. The variables being used in the dynamic tracing session can be shared across multiple VMs for interoperability of tracing and have the capability of making tracing decisions on-the-fly.

FIG. 3 depicts a block diagram of components of FIG. 1, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Components include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 316 and cache memory 318. In general, memory 306 can include any suitable volatile or non-volatile computer readable storage media.

Programs are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. Programs may be downloaded to persistent storage 308 through communications unit 312.

I/O interface(s) 314 allows for input and output of data with other devices that may be connected. For example, I/O interface 314 may provide a connection to external device(s) 320 such as a keyboard, keypad, a touch screen, and/or some other suitable input device. External device(s) 320 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 314. I/O interface(s) 314 also connect to a display 322.

Display 322 provides a mechanism to display data to a user and may be, for example, a computer monitor or an incorporated display screen, such as is used in tablet computers and smart phones.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product comprising:
a non-transitory computer readable storage medium and program instructions stored on the non-transitory computer readable storage medium, the program instructions comprising:
program instructions to select a home node from a plurality of nodes;
program instructions to identify by a tracing agent of the home node, a set of tracing agents associated with the plurality of nodes;
responsive to identifying the set of tracing agents associated with the plurality of nodes, program instructions to apply a set of probes to the set of tracing agents associated with the plurality of nodes, wherein each tracing agent, of the set of tracing agents associated with the plurality of nodes, will store a probe, of the set of probes, in each node, of the plurality of nodes, respectively;
program instructions to determine whether the application of the set of probes to the set of tracing agents associated with the plurality of nodes was successful;
responsive to determining that the application of the set of probes to the set of tracing agents associated with the plurality of nodes was successful, program instructions to send an indication to the set of probes to start collecting data, wherein collecting data comprises program instructions to save the collected data in each respective node of the plurality of nodes;
program instructions to perform, by the tracing agent of the home node, a handshake with the plurality of nodes, wherein the program instructions to perform a handshake with the plurality of nodes comprise program instructions to determine, by the tracing agent of the home node, and the set of tracing agents associated with the plurality of nodes, a maximum amount of data to be shared;
program instructions to send, to the tracing agent of the home node and the set of tracing agents associated with the plurality of nodes, an indication to start probing;
program instructions to determine whether the tracing agent of the home node and the set of tracing agents associated with the plurality of nodes have started probing;
responsive to determining that the tracing agent of the home node and the set of tracing agents associated with the plurality of nodes have started probing, program instructions to continue tracing, collect data, and save data; and
program instructions to display the saved data to a user, wherein the program instructions to display the saved data comprise program instructions to pull, by the home node, the collection of data saved in each respective node of the plurality of nodes and display the collection of data from the home node.

* * * * *